(12) United States Patent
Mir (10) Patent No.: US 12,545,174 B2
(45) Date of Patent: Feb. 10, 2026

(54) ROAD SURFACE CONDITION VIEWING APPARATUS

(71) Applicant: SUBARU CORPORATION, Tokyo (JP)

(72) Inventor: Rezowan Ahad Mir, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 159 days.

(21) Appl. No.: 17/891,661

(22) Filed: Aug. 19, 2022

(65) Prior Publication Data

US 2023/0077538 A1   Mar. 16, 2023

(30) Foreign Application Priority Data

Sep. 15, 2021   (JP) .................................. 2021-150125

(51) Int. Cl.
*B60Q 1/08*   (2006.01)

(52) U.S. Cl.
CPC ........ *B60Q 1/085* (2013.01); *B60Q 2300/122* (2013.01); *B60Q 2300/312* (2013.01); *B60Q 2300/32* (2013.01); *B60Q 2400/20* (2013.01); *B60Q 2400/50* (2013.01)

(58) Field of Classification Search
CPC ............. B60Q 1/085; G02B 5/02; G02B 5/20
See application file for complete search history.

(56) References Cited

U.S. PATENT DOCUMENTS

| 10,134,280 | B1* | 11/2018 | You ..................... B60Q 1/525 |
| 2018/0361912 | A1 | 12/2018 | Daiku |
| 2018/0361917 | A1* | 12/2018 | Kim ..................... B60Q 1/543 |
| 2020/0063938 | A1* | 2/2020 | Kurashige ............. G02B 27/30 |
| 2022/0178510 | A1* | 6/2022 | Bushre ................... B60Q 1/08 |
| 2022/0410795 | A1* | 12/2022 | Tatara ................... F21S 43/15 |

FOREIGN PATENT DOCUMENTS

| JP | 2001-270380 A | 10/2001 |
| JP | 2005-32819 A | 12/2005 |
| JP | 2015132707 A * | 7/2015 .............. B60Q 1/50 |
| JP | 2017-119469 A | 7/2017 |
| JP | 2018058412 A | 4/2018 |
| JP | 2018127135 A | 8/2018 |
| JP | 2021-127071 A | 9/2021 |

OTHER PUBLICATIONS

Office Action issued in the corresponding Japanese Patent Application No. 2021-150125 on Apr. 15, 2025, w/ English Translation.

* cited by examiner

*Primary Examiner* — Luke Huynh
(74) *Attorney, Agent, or Firm* — Rimon P.C.

(57) ABSTRACT

A road surface condition viewing apparatus includes an illuminator provided on front side of a vehicle. The illuminator is configured to apply dot-shaped pieces of projection light to a road surface in a vehicle traveling direction. The dot-shaped pieces of projection light are arranged at predetermined intervals and visually recognizable by a driver who drives the vehicle.

7 Claims, 9 Drawing Sheets

ROAD SURFACE CONDITION VIEWING APPARATUS

CROSS-REFERENCE TO RELATED APPLICATIONS

This application claims priority from Japanese Patent Application No. 2021-150125 filed on Sep. 15, 2021, the entire contents of which are hereby incorporated by reference.

BACKGROUND

The technology relates to a road surface condition viewing apparatus.

Typically, in traveling on a road surface in or after rain at nighttime, a driver may have difficulty in recognizing conditions of a road surface due to reflection of light emitted from a headlamp of an own vehicle and light emitted from a headlamp of an oncoming vehicle by the road surface.

A technique of providing an additional irradiator has been known. The additional irradiator applies a visible point light beam to a position corresponding to an end of a vehicle on a road surface visually recognizable by a driver. For example, reference is made to Japanese Unexamined Patent Application Publication (JP-A) No. 2001-270380.

SUMMARY

An aspect of the technology provides a road surface condition viewing apparatus including an illuminator provided on front side of a vehicle. The illuminator is configured to apply dot-shaped pieces of projection light to a road surface in a vehicle traveling direction. The dot-shaped pieces of projection light are arranged at predetermined intervals and visually recognizable by a driver who drives the vehicle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

A technique disclosed in JP-A No. 2001-270380 allows a driver to easily recognize a position of an end of a vehicle in a widthwise direction by applying a visible point light beam to a position corresponding to the end of the vehicle. The technique is not to recognize conditions of a road surface, and has room for improvement in terms of allowing the driver to accurately recognize the conditions of the road surface on which the vehicle travels at nighttime.

It is desirable to provide a road surface condition viewing apparatus that allows a driver to accurately recognize a condition of a road surface on which a vehicle travels, in a situation in which light reflection by the road surface is expected.

Some example embodiments of the technology will now be described with reference to FIGS. 1 to 9. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

First Example Embodiment

A road surface condition viewing apparatus 1 according to a first example embodiment is described with reference to FIGS. 1 to 5.

[Configuration of Road Surface Condition Viewing Apparatus 1]

Figure 1:
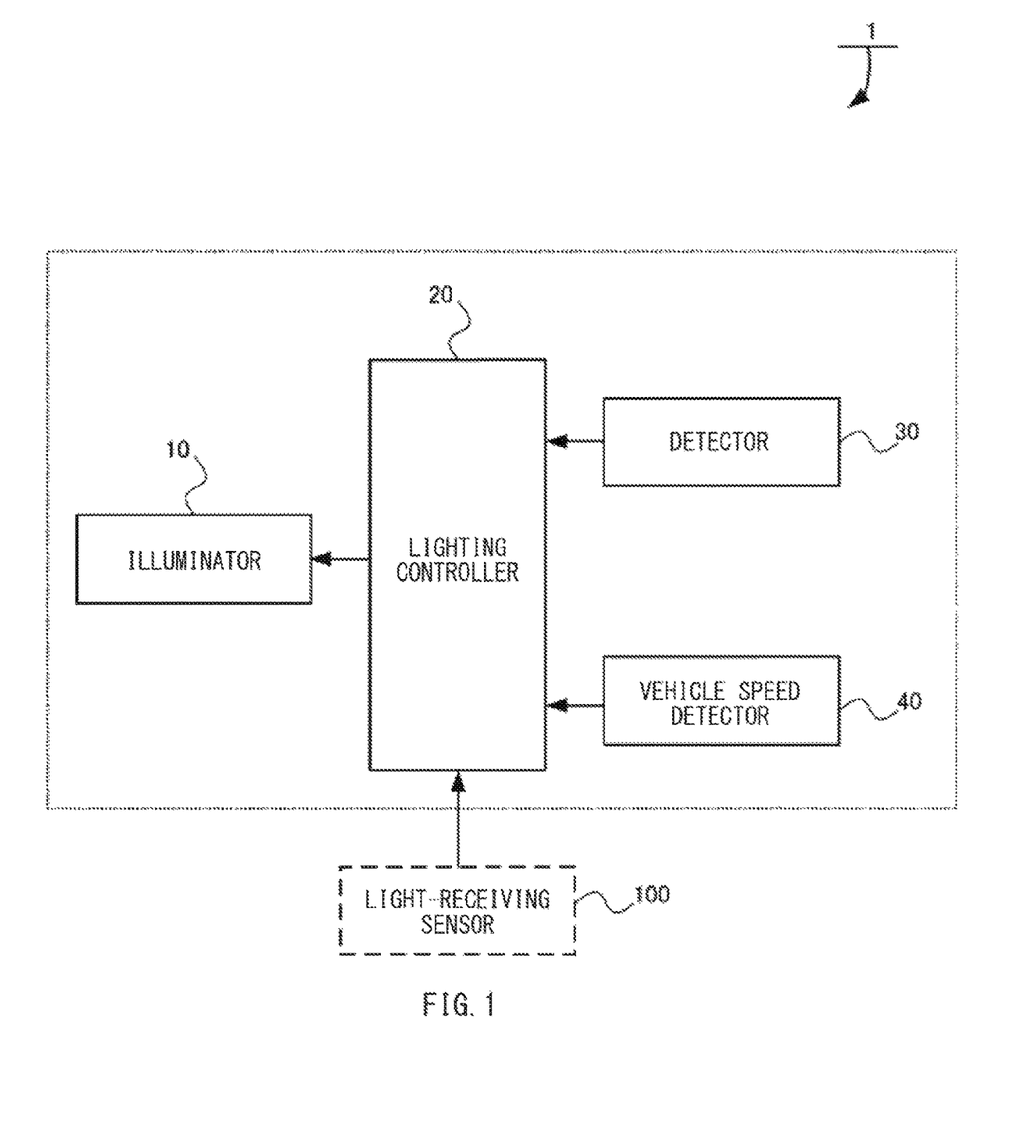
FIG. 1 is a block diagram illustrating a configuration of a road surface condition viewing apparatus according to one example embodiment of the technology.

As illustrated in FIG. 1, the road surface condition viewing apparatus 1 according to the first example embodiment may include an illuminator 10, a lighting controller 20, a detector 30, and a vehicle speed detector 40.

Figure 2:
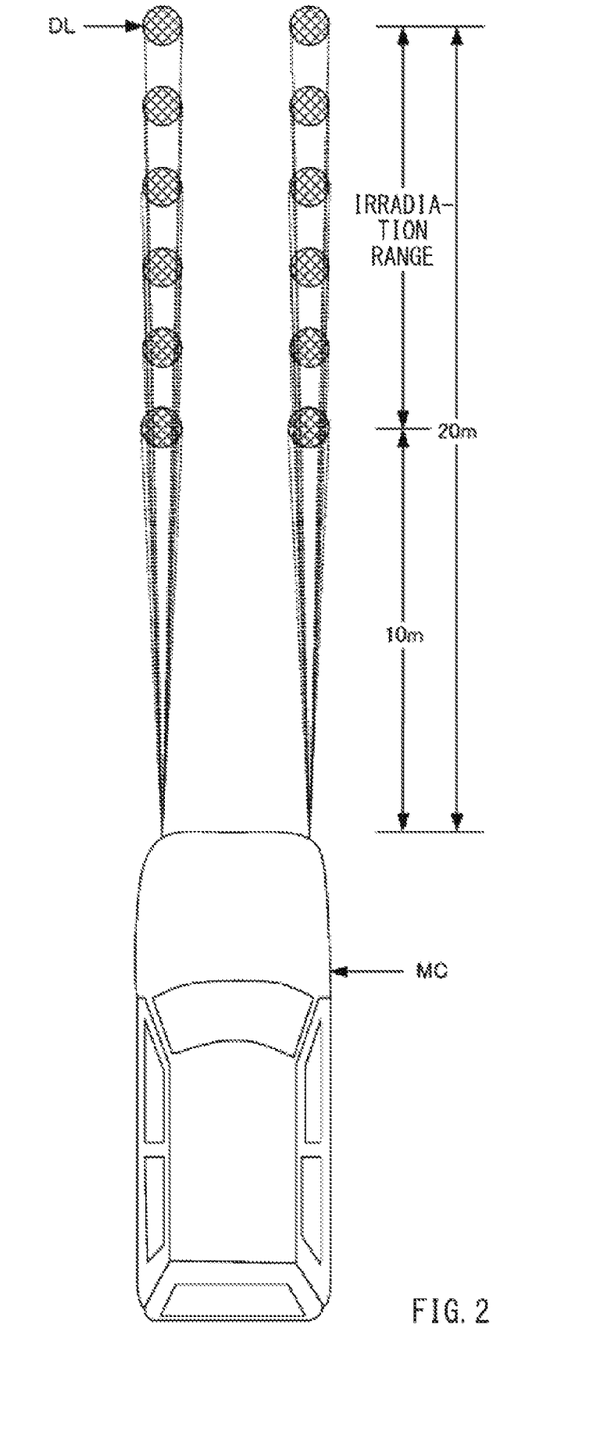
FIG. 2 is a diagram schematically illustrating a state of projection from an illuminator to a road surface according to one example embodiment of the technology.

The illuminator 10 is provided on front side of a vehicle MC. As illustrated in FIG. 2, the illuminator 10 applies dot-shaped pieces of projection light DL to a road surface in a traveling direction of the vehicle MC. The dot-shaped pieces of projection light DL are arranged at predetermined intervals visually recognizable by a driver.

Figure 3:
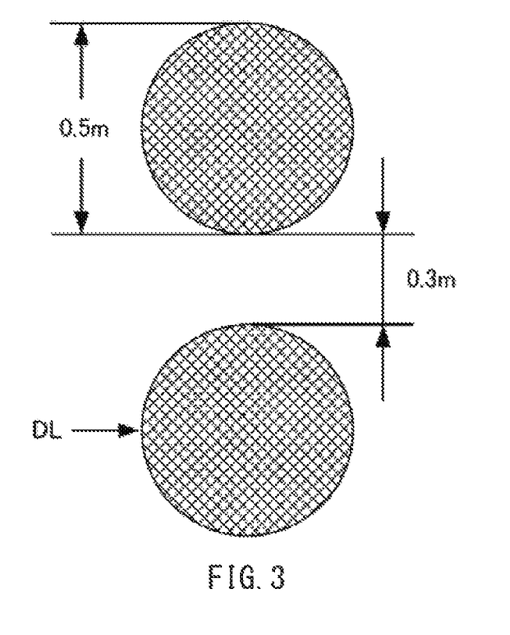
FIG. 3 is a diagram illustrating an exemplary projection size of dot-shaped piece of projection light emitted from the illuminator according to one example embodiment of the technology.

For example, as illustrated in FIG. 3, in a case where the dot-shaped pieces of projection light DL each have a diameter of 50 cm, a clearance between adjacent two of the dot-shaped pieces of projection light DL as the predetermined interval may be, for example, 0.3 m.

The illuminator 10 may include a plurality of light-emitting diodes (LEDs) linearly arranged. The illuminator 10 may be disposed at each of both front ends of the vehicle MC to cause an arrangement direction of the plurality of LEDs to be orthogonal to the road surface.

For example, the illuminator 10 may be disposed near a front combination lamp. In a case where a fog lamp is separately configured, the illuminator 10 may be accommodated, for example, in the front combination lamp or the fog lamp.

An irradiation range of the illuminator 10 may be a range of a linear distance in which the dot-shaped pieces of projection light DL are formable and are unobtrusive in number to the driver, from a position where fine adjustment of a position of the vehicle MC is possible in consideration of a general traveling speed. As illustrated in FIG. 2, the position where the fine adjustment of the position of the vehicle MC is possible may be, for example, 10 m in front of the vehicle MC, and the linear distance may be, for example, 10 m. That is, the irradiation range of the illuminator 10 may be, for example, a range from 10 m to 20 m in front of the vehicle MC. The illuminator 10 may project the dot-shaped pieces of projection light DL within a predetermined area defined with respect to a position of the vehicle MC. The predetermined area is an area on a horizontal plane with respect to a position of the vehicle MC when the vehicle MC is traveling straight ahead at a constant speed on the horizontal plane. The predetermined area is an area from a front end of the vehicle MC forward more than a first distance along a front-rear direction of the vehicle MC and within a second distance longer than the first distance along the front-rear direction from the front end of the vehicle MC. The first distance is, for example, 10 m and the second distance is, for example, 20 m. The first distance may be a distance at which the driver can initiate driving operations corresponding to a road surface conditions within the predetermined area while the vehicle MC travels the first distance. The first distance and the second distance may increase as a vehicle speed of the vehicle MC increases.

The LEDs included in the illuminator 10 each may have a light emission color of red or yellow, for example.

Figure 4A:
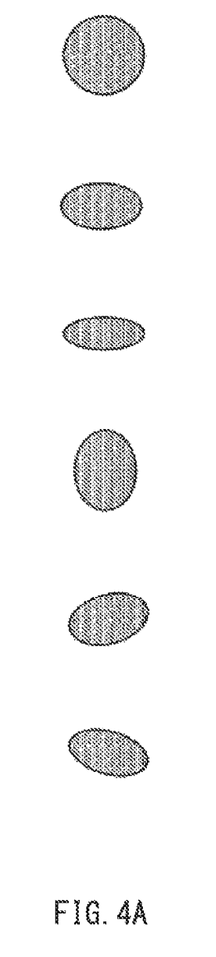
FIGS. 4A and 4B are diagrams illustrating exemplary reflection light from a road surface according to one example embodiment of the technology.
Figure 4B:
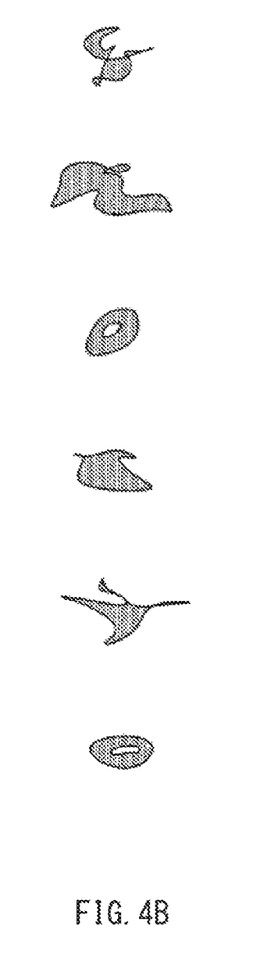

Respective pieces of road surface reflection light, i.e., the dot-shaped pieces of projection light DL reflected by the road surface, to be visually recognized by the driver may have shapes as illustrated in FIGS. 4A and 4B.

FIG. 4A illustrates respective shapes of the pieces of road surface reflection light in a case where the road surface is dry, and FIG. 4B illustrates respective shapes of the pieces of road surface reflection light in a case where the same road surface is wet.

As can be seen from these diagrams, even in the case where the road surface is dry (FIG. 4A), the respective shapes of the pieces of road surface reflection light are deformed from the original respective shapes of the dot-shaped pieces of projection light DL due to an influence of, for example, unevenness of the road surface or a rut. In the case where the road surface is wet due to an influence of, for example, rain or snow (FIG. 4B), the respective shapes of the pieces of road surface reflection light are greatly deformed beyond recognition from the original respective shapes of the dot-shaped pieces of projection light DL due to diffuse reflection of light by water in addition to the influence of, for example, unevenness of the road surface or a rut.

The lighting controller 20 may control a lighting state of the illuminator 10.

In one example, the lighting controller 20 may turn on the illuminator 10 in a case where the vehicle MC is traveling with a headlamp being on and where the lighting controller 20 detects rainfall, snowfall, or a puddle or snow cover on the road surface, by information acquired by the detector 30 described later, information acquired by the vehicle speed detector 40 described later, and, for example, a received signal from a light-receiving sensor 100.

The lighting controller 20 may determine a lighting state of the headlamp by an on-off state of a light switch.

The detector 30 may detect rainfall by a received signal from an unillustrated rainfall sensor, for example.

The detector 30 may detect snowfall by a received signal from an unillustrated snowfall sensor, for example.

The detector 30 may detect a puddle on the road surface or snow cover on the road surface by an image captured by an unillustrated imaging device, for example.

The detector 30 may supply detected information to the lighting controller 20.

The vehicle speed detector 40 may include, for example, a vehicle speed sensor, and may output acquired information to the lighting controller 20.

In a case where a vehicle speed of the vehicle MC is, for example, 10 km/h or higher according to information acquired by the vehicle speed detector 40, the lighting controller 20 may determine that the vehicle MC is traveling.

[Process in Road Surface Condition Viewing Apparatus 1]

A process to be executed by the road surface condition viewing apparatus 1 according to the first example embodiment is described with reference to FIG. 5.

Figure 5:
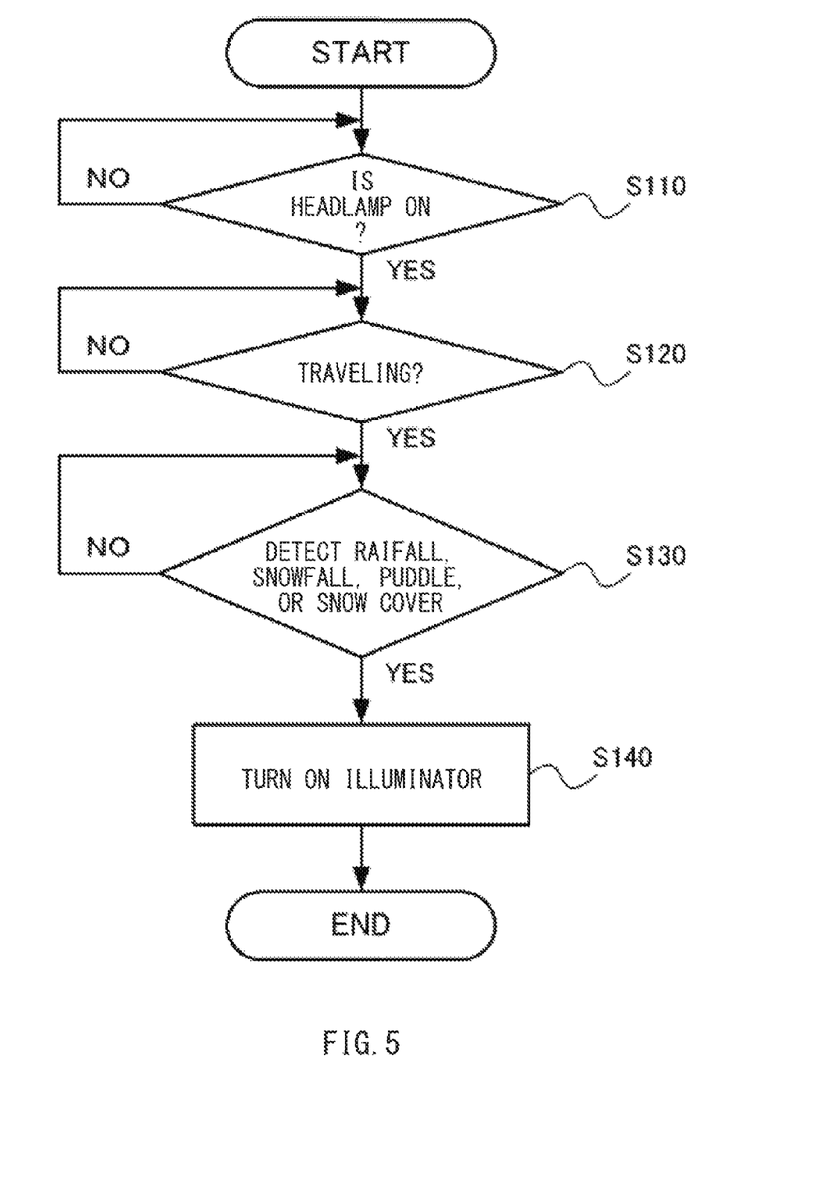
FIG. 5 is a flowchart illustrating a process to be executed by the road surface condition viewing apparatus according to one example embodiment of the technology.

As illustrated in FIG. 5, for example, the lighting controller 20 may determine, by the received signal from the light-receiving sensor 100, whether the headlamp is on (step S110).

In a case where the lighting controller 20 determines that the headlamp is not on (step S110: NO), the lighting controller 20 may cause the process to return to step S110 and be put on standby.

In a case where the lighting controller 20 determines that the headlamp is on (step S110: YES), the lighting controller 20 may thereafter determine whether the vehicle MC is traveling, on the basis of information detected by the vehicle speed detector 40 (step S120).

In a case where the lighting controller 20 determines that the vehicle MC is not traveling (step S120: NO), the lighting controller 20 may cause the process to return to step S120 and be put on standby.

In a case where the lighting controller 20 determines that the vehicle MC is traveling (step S120: YES), the lighting controller 20 may thereafter determine whether rainfall, snowfall, a puddle on the road surface, or snow cover on the road surface is detected, on the basis of information detected by the detector 30 (step S130).

In a case where the lighting controller 20 determines that rainfall, snowfall, a puddle on the road surface, or snow cover on the road surface is not detected (step S130: NO), the lighting controller 20 may cause the process to return to step S130 and be put on standby.

In a case where the lighting controller 20 determines that rainfall, snowfall, a puddle on the road surface, or snow cover on the road surface is detected (step S130: YES), the lighting controller 20 may turn on the illuminator 10 (step S140), and end the process.

[Workings and Effects]

The road surface condition viewing apparatus 1 according to the first example embodiment includes the illuminator 10 that is provided on front side of the vehicle MC. The illuminator 10 applies the dot-shaped pieces of projection light DL to the road surface. The dot-shaped pieces of projection light DL are arranged at predetermined intervals visually recognizable by the driver.

That is, the illuminator 10 applies the dot-shaped pieces of projection light DL, that is, pieces of spot light, which makes it possible to effectively suppress influences of, for example, unevenness of the road surface and a rut, and diffuse reflection by water, as compared with a case where, for example, a headlamp applies light in a wide range.

For example, when the dot-shaped pieces of projection light DL arranged at the predetermined intervals visually recognizable by the driver are applied to the road surface in a case where the road surface is wet due to an influence of, for example, rain or snow, the respective shapes of the pieces of road surface reflection light are greatly deformed beyond recognition from the original respective shapes of the dot-shaped pieces of projection light due to diffuse reflection of light by water in addition to the influence of, for example, unevenness of the road surface or a rut, as compared with a case where the road surface is dry.

This makes it possible for the driver to recognize a puddle on a road surface over which a tire is to pass, snow cover on the road surface, unevenness of the road surface, or a rut by recognizing the shapes of the pieces of road surface reflection light.

The dot-shaped pieces of projection light DL each having an appropriate size may be arranged on the road surface at the predetermined intervals visually recognizable by the driver, which makes it possible for the driver to recognize a puddle on a road surface over which a tire is to pass, snow cover on the road surface, unevenness of the road surface, or a rut without giving an obtrusive impression to the driver by applying the dot-shaped pieces of projection light DL.

This allows the driver to drive the vehicle, for example, even in rain or snow at nighttime with composure, thus making it possible for the driver to drive the vehicle with security.

The illuminator 10 in the road surface condition viewing apparatus 1 according to the first example embodiment may include the plurality of LEDs linearly arranged, and may be disposed at each of both front ends of the vehicle MC to cause the arrangement direction of the plurality of LEDs to be orthogonal to the road surface.

This makes it possible, to the road surface over which the tire is to pass, the dot-shaped pieces of projection light DL arranged at the predetermined intervals visually recognizable by the driver with a simple configuration.

This allows the driver to drive the vehicle, for example, even in rain or snow at nighttime with composure, thus making it possible for the driver to drive the vehicle with security.

The illuminator 10 in the road surface condition viewing apparatus 1 according to the first example embodiment may apply the dot-shaped pieces of projection light arranged at the predetermined intervals in a range in which the dot-shaped pieces of projection light DL are formable and are unobtrusive in number to the driver, from the position where fine adjustment of the position of the vehicle MC is possible.

That is, in consideration of a general traveling speed, the irradiation range of the dot-shaped pieces of projection light may be a range in which the dot-shaped pieces of projection light DL are formable and are unobtrusive in number to the driver, from the position where fine adjustment of the position of the vehicle MC is possible.

This makes it possible for the driver to sufficiently recognize the shapes of the pieces of road surface reflection light without obstruction to driving, thus making it possible to take on an appropriate avoidance behavior in a case where the driver recognizes that a puddle, snow cover, unevenness of the road surface, or a rut is present on a road ahead.

The LEDs included in the illuminator 10 of the road surface condition viewing apparatus 1 according to the first example embodiment may have a light emission color of red or yellow, for example.

That is, for example, red or yellow light has excellent visibility in a case where the red or yellow light is applied to a road surface with a puddle or snow cover at nighttime.

Providing the LEDs included in the illuminator 10 with the light emission color of red or yellow makes it possible to improve visibility in expected scenes.

This allows the driver to drive the vehicle, for example, even in rain or snow at nighttime with composure, thus making it possible for the driver to drive the vehicle with security.

The light controller 20 in the road surface condition viewing apparatus 1 according to the first example embodiment may turn on the illuminator 10 in a case where the vehicle MC is traveling with the headlamp being on and where the lighting controller 20 detects rainfall, snowfall, a puddle on the road surface, or snow cover on the road surface.

That is, the lighting controller 20 may turn on the illuminator 10 on condition that the vehicle MC is traveling with the headlamp being on and the lighting controller 20 detects rainfall, snowfall, a puddle on the road surface, or snow cover on the road surface.

The illuminator 10 in the road surface condition viewing apparatus 1 according to the first example embodiment is an additional illuminator, and the illuminator 10 may be on only on condition that the vehicle MC is traveling with the headlamp being on and the lighting controller 20 detects one of rainfall, snowfall, and a puddle on the road surface, and snow cover on the road surface.

This makes it possible to reduce as much power consumption of the illuminator 10 as possible.

Second Example Embodiment

A road surface condition viewing apparatus 1A according to a second example embodiment is described with reference to FIGS. 6 and 7.

[Configuration of Road Surface Condition Viewing Apparatus 1A]

Figure 6:
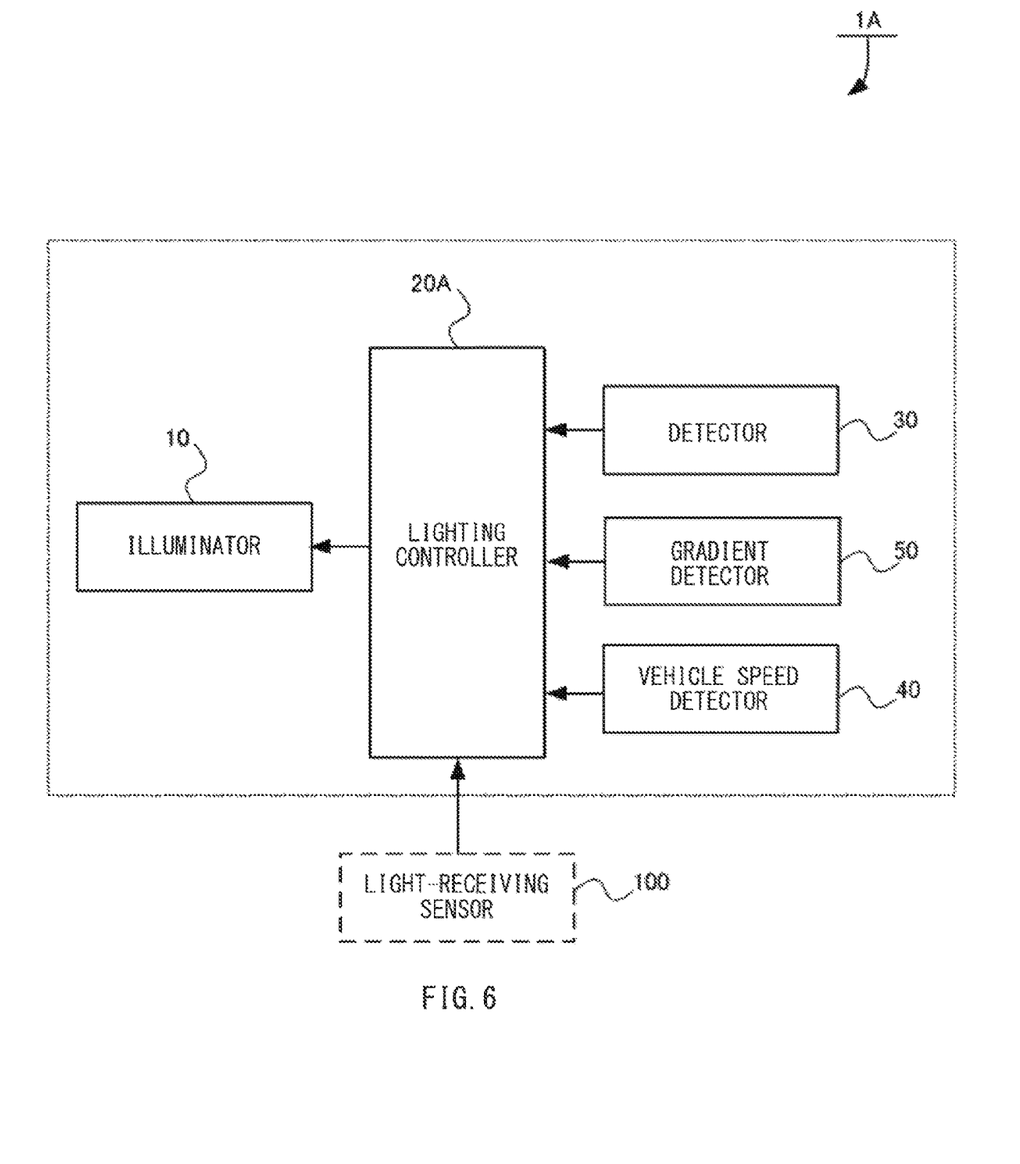
FIG. 6 is a block diagram illustrating a configuration of a road surface condition viewing apparatus according to one example embodiment of the technology.

As illustrated in FIG. 6, the road surface condition viewing apparatus 1A according to the second example embodiment may include the illuminator 10, a lighting controller 20A, the detector 30, the vehicle speed detector 40, and a gradient detector 50.

It is to be noted that constituent elements denoted by the same reference characters as those of the first example embodiment have similar configurations, and therefore detailed description thereof is omitted.

The lighting controller 20A may turn off the illuminator 10 in a case where the lighting controller 20A determines, by a detection result of the gradient detector 50, that a road on which the vehicle MC is traveling has a predetermined or greater up gradient or down gradient.

Herein, a "predetermined or greater gradient" may be, for example, a gradient that is assumed to cause rainwater not to stay on a road surface in consideration of roughness of the road surface.

The gradient detector 50 may detect a gradient of a road on which the vehicle MC travels.

The gradient detector 50 may include, for example, a tilt sensor. The gradient detector 50 may detect a gradient in the traveling direction of the vehicle MC to detect the gradient of the road on which the vehicle MC travels.

[Process in Road Surface Condition Viewing Apparatus 1A]

A process to be executed by the road surface condition viewing apparatus 1A according to the second example embodiment is described with reference to FIG. 7.

Figure 7:
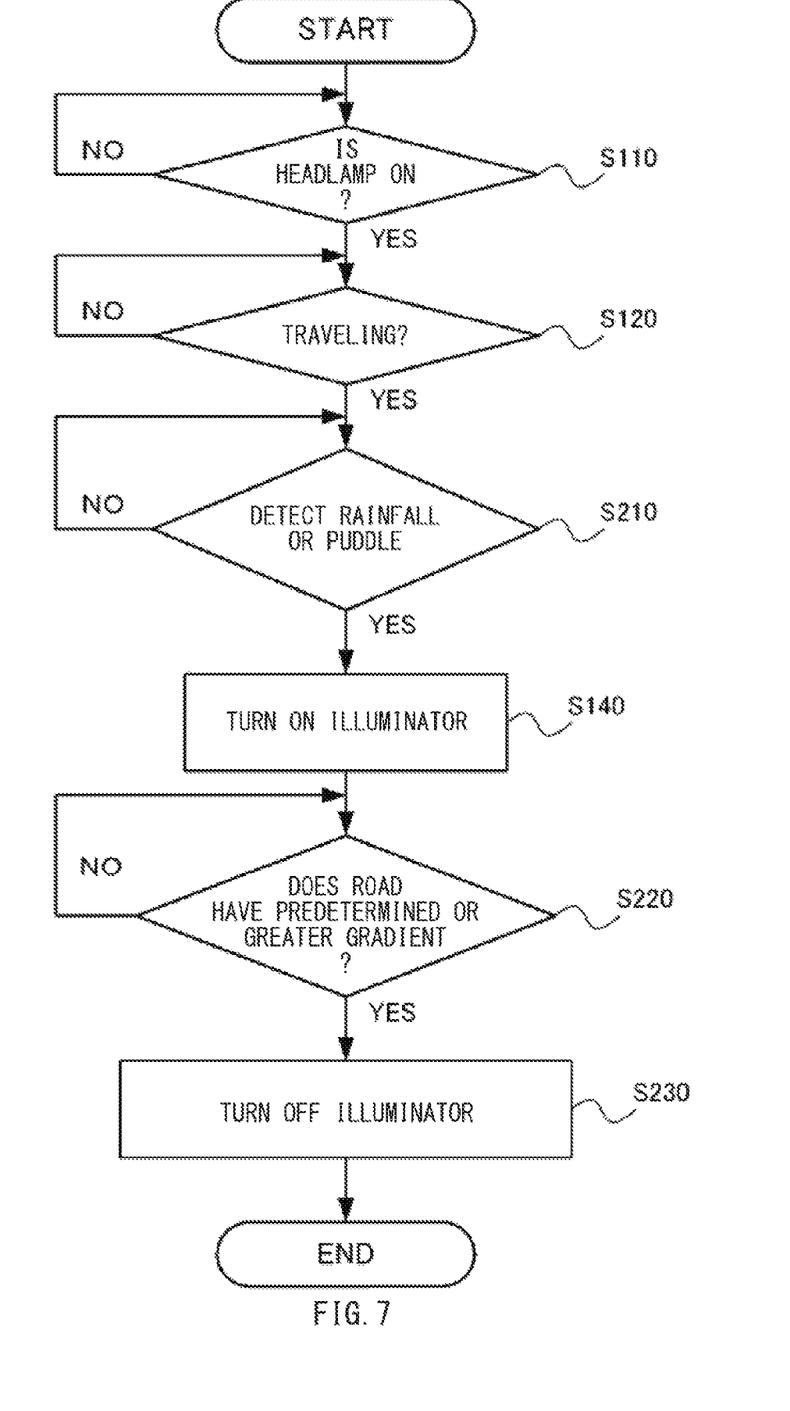
FIG. 7 is a flowchart illustrating a process to be executed by the road surface condition viewing apparatus according to one example embodiment of the technology.

As illustrated in FIG. 7, for example, the lighting controller 20A may determine, by the received signal from the light-receiving sensor 100, whether the headlamp is on (step S110).

In a case where the lighting controller 20A determines that the headlamp is not on (step S110: NO), the lighting controller 20A may cause the process to return to step S110 and be put on standby.

In a case where the lighting controller 20A determines that the headlamp is on (step S110: YES), the lighting controller 20A may thereafter determine whether the vehicle MC is traveling, on the basis of information detected by the vehicle speed detector 40 (step S120).

In a case where the lighting controller 20A determines that the vehicle MC is not traveling (step S120: NO), the lighting controller 20A may cause the process to return to step S120 and be put on standby.

In a case where the lighting controller 20A determines that the vehicle MC is traveling (step S120: YES), the lighting controller 20A may thereafter determine whether rainfall or a puddle on the road surface is detected, on the basis of information detected by the detector 30 (step S210).

In a case where the lighting controller 20A determines that rainfall or a puddle on the road surface is not detected (step S210: NO), the lighting controller 20A may cause the process to return to step S210 and be put on standby.

In a case where the lighting controller 20A determines that rainfall or a puddle on the road surface is detected (step S210: YES), the lighting controller 20A may turn on the illuminator 10 (step S140).

Thereafter, the lighting controller 20A may determine whether a road on which the vehicle MC travels has a predetermined or greater gradient, on the basis of the detection result of the gradient detector 50 (step S220).

In a case where the lighting controller 20A determines that the road on which the vehicle MC travels does not have the predetermined or greater gradient (step S220: NO), the lighting controller 20A may cause the process to return to step S220 and be put on standby.

In a case where the lighting controller 20A determines that the road on which the vehicle MC travels has the predetermined or greater gradient (step S220: YES), the lighting controller 20A may turn off the illuminator 10 (step S230), and end the process.

[Workings and Effects]

The lighting controller 20A of the road surface condition viewing apparatus 1A according to the second example embodiment may turn off the illuminator 10 in a case where the lighting controller 20A determines, by the detection result of the gradient detector 50, that the road on which the vehicle MC is traveling has the predetermined or greater up gradient or down gradient.

That is, in a case where the lighting controller 20A determines that the road on which the vehicle MC is traveling has the predetermined or greater up gradient or down gradient, even in rain falling to some extent, rainwater having fallen on the road surface flows to lower side by the gradient depending on the degree of the gradient; therefore, there is extremely low possibility that a puddle is made on the road surface on which the vehicle MC is to travel. If a road on which the vehicle MC is traveling has the predetermined or greater up gradient, rainwater having fallen on the road surface substantially uniformly comes to the vehicle MC as water streams. Accordingly, even if the position of the vehicle MC is finely adjusted, it is difficult to avoid all water streams.

If the road on which the vehicle MC is traveling has the predetermined or greater down gradient, the vehicle MC so travels as to follow a water stream caused by rainwater having fallen on the road surface. Accordingly, there is little point in finely adjusting the position of the vehicle MC.

For the road on which the vehicle MC is traveling having a steep up or down gradient, even if it is tried to apply, by means of the illuminator 10, the dot-shaped pieces of projection light DL arranged at the predetermined intervals visually recognizable by the driver to the road surface in the traveling direction of the vehicle MC, the gradient of the road causes change in sizes of the dot-shaped pieces of projection light DL or a decrease in the clearance between adjacent two of the dot-shaped pieces of projection light DL, which may make the driver feel annoying.

Accordingly, in a case where the lighting controller 20 determines, by the detection result of the gradient detector 50, that the road on which the vehicle MC is traveling has the predetermined or greater up or down gradient, the lighting controller 20 may turn off the illuminator 10, which makes it possible to reduce power consumption of the illuminator 10.

Third Example Embodiment

A road surface condition viewing apparatus 1B according to a third example embodiment is described with reference to FIGS. 8 and 9.

[Configuration of Road Surface Condition Viewing Apparatus 1B]

Figure 8:
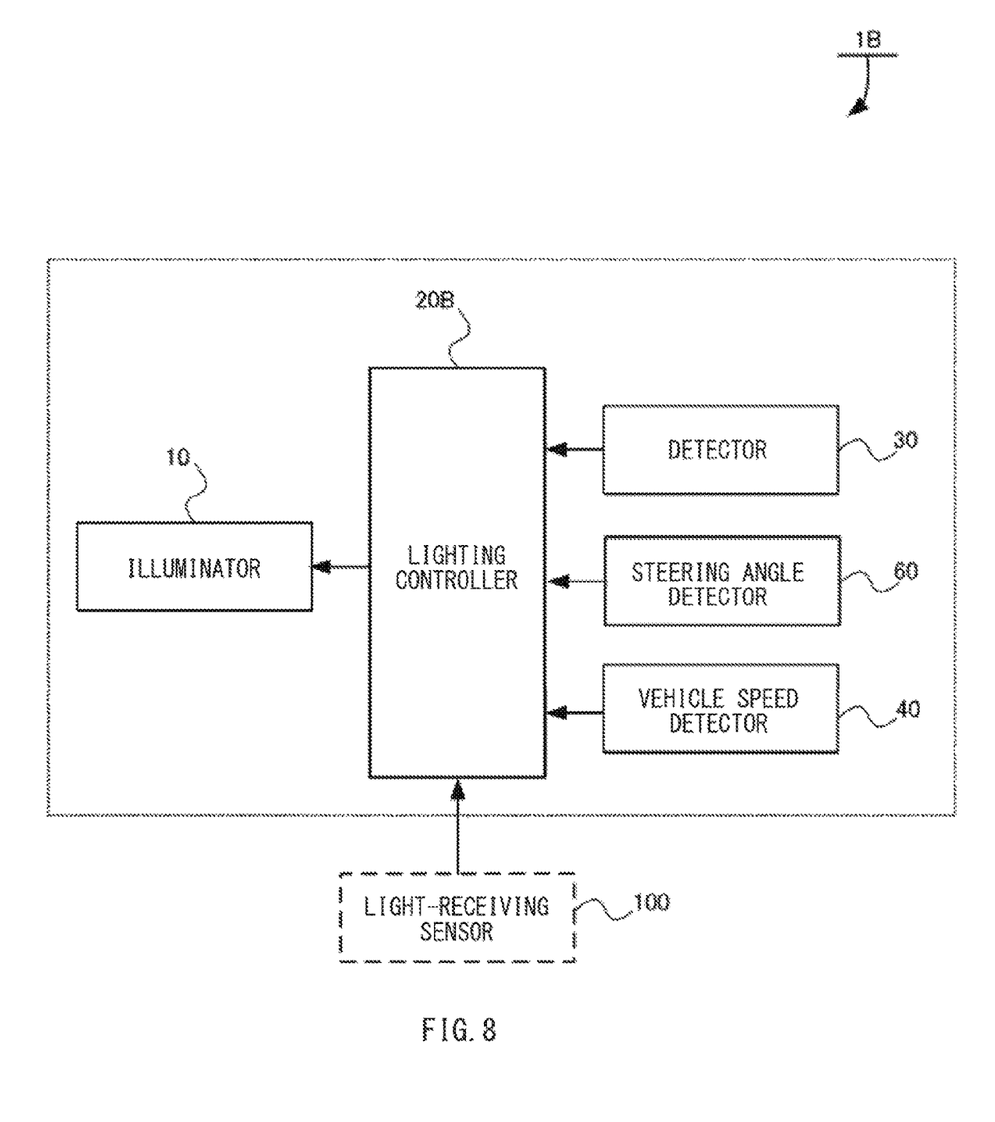
FIG. 8 is a block diagram illustrating a configuration of a road surface condition viewing apparatus according to one example embodiment of the technology.

As illustrated in FIG. 8, the road surface condition viewing apparatus 1B according to the third example embodiment may include the illuminator 10, a lighting controller 20B, the detector 30, the vehicle speed detector 40, and a steering angle detector 60.

It is to be noted that constituent elements denoted by the same reference characters as those of the first example embodiment and the second example embodiment have similar configurations, and therefore detailed description thereof is omitted.

The steering angle detector 60 may detect a steering angle.

The steering angle detector 60 may supply detected information about the steering angle to the lighting controller 20B described later. In the third example embodiment, the steering angle detector 60 has been described as one example; however, for example, a sensor configured to detect acceleration of the vehicle MC in the vehicle widthwise direction may be used.

The lighting controller 20B may turn off the illuminator 10 in a case where the lighting controller 20B determines, by a detection result of the steering angle detector 60, that the vehicle MC is traveling on a curve.

For example, in a case where steering angle information acquired by the steering angle detector 60 has a larger value than that during normal traveling and where similar steering angle information continues for a certain time (e.g., 1 second or longer), the lighting controller 20B may determine that the vehicle MC is traveling on a curve, and turn off the illuminator 10.

[Process in Road Surface Condition Viewing Apparatus 1B]

A process to be executed by the road surface condition viewing apparatus 1B according to the third example embodiment is described with reference to FIG. 9.

Figure 9:
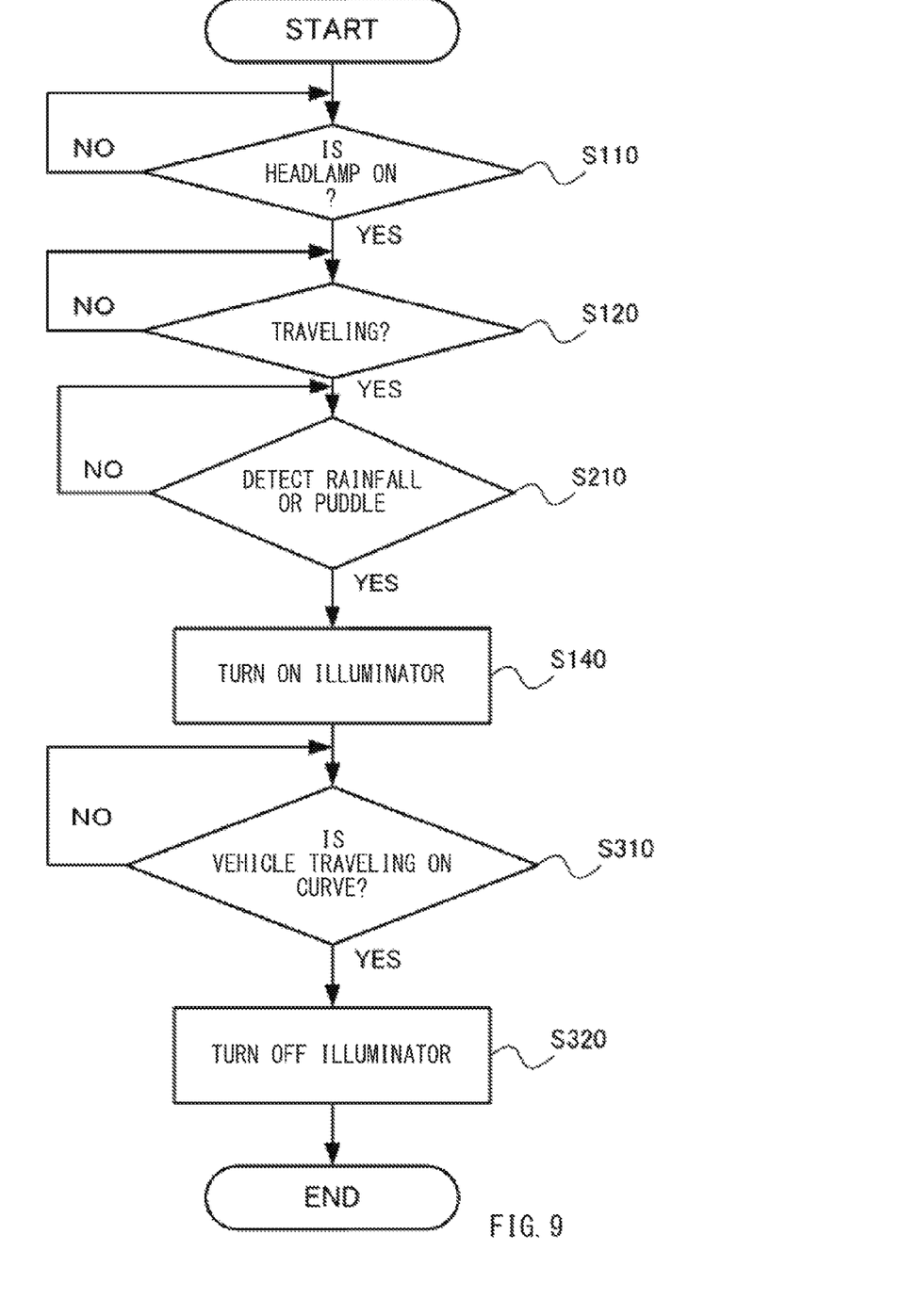
FIG. 9 is a flowchart illustrating a process to be executed by the road surface condition viewing apparatus according to one example embodiment of the technology.

As illustrated in FIG. 9, for example, the lighting controller 20B may determine, by the received signal from the light-receiving sensor 100, whether the headlamp is on (step S110).

In a case where the lighting controller 20B determines that the headlamp is not on (step S110: NO), the lighting controller 20B may cause the process to return to step S110 and be put on standby.

In a case where the lighting controller 20B determines that the headlamp is on (step S110: YES), the lighting controller 20B may thereafter determine whether the vehicle MC is traveling, on the basis of information detected by the vehicle speed detector 40 (step S120).

In a case where the lighting controller 20B determines that the vehicle MC is not traveling (step S120: NO), the lighting controller 20B may cause the process to return to step S120 and be put on standby.

In a case where the lighting controller 20B determines that the vehicle MC is traveling (step S120: YES), the lighting controller 20B may thereafter determine whether rainfall or a puddle on the road surface is detected, on the basis of information detected by the detector 30 (step S210).

In a case where the lighting controller 20B determines that rainfall or a puddle on the road surface is not detected (step S210: NO), the lighting controller 20B may cause the process to return to step S210 and be put on standby.

In a case where the lighting controller 20B determines that rainfall or a puddle on the road surface is detected (step S210: YES), the lighting controller 20B may turn on the illuminator 10 (step S140).

Thereafter, the lighting controller 20B may determine whether the vehicle MC is traveling on a curve, on the basis of the detection result of the steering angle detector 60 (step S310).

In a case where the lighting controller 20B determines that the vehicle MC is not traveling on a curve (step S310: NO), the lighting controller 20B may cause the process to return to step S310 and be put on standby.

In a case where the lighting controller 20B determines that the vehicle MC is traveling on a curve (step S310: YES), the lighting controller 20B may turn off the illuminator 10 (step S320), and end the process.

[Workings and Effects]

The lighting controller 20B of the road surface condition viewing apparatus 1B according to the third example embodiment may turn off the illuminator 10 in a case where the lighting controller 20B determines, by the detection result of the steering angle detector 60, that the vehicle MC is traveling on a curve.

That is, in a case where the vehicle MC is traveling on a curve, a moving direction of the tire is different from an irradiation direction of the illuminator 10.

In such a case, even if the driver recognizes a puddle, snow cover, unevenness of the road surface, or a rut on the road surface by dot-shaped pieces of projection light, the tire passes inside the puddle, the snow cover, unevenness of the road surface, or the rut; therefore, there is little point in causing the driver to recognize such a condition.

Accordingly, in a case where the lighting controller 20B determines, by the detection result of the steering angle detector 60, that the vehicle MC is traveling on a curve, the lighting controller 20B may turn off the illuminator 10, which makes it possible to reduce power consumption of the illuminator 10.

Modification Examples

For example, in the second example embodiment, in a case where the lighting controller 20A determines, by the detection result of the gradient detector 50, that a road on which the vehicle MC is traveling has the predetermined or greater up gradient or down gradient, the lighting controller 20A may turn off the illuminator 10. Even in such a case, the illuminator 10 may be turned on in a range in which it is possible to maintain the respective sizes of the dot-shaped pieces of projection light DL and maintain the clearance between adjacent two of the dot-shaped pieces of projection light DL, in the irradiation range.

Doing so narrows the irradiation range of the illuminator 10; however, the driver is able to recognize a puddle on a road surface over which a tire is to pass, snow cover on the road surface, unevenness of the road surface, or a rut at least in the narrowed irradiation range, thus making it possible to take on an appropriate avoidance behavior.

For example, in the second example embodiment, in the case where the lighting controller 20A determines, by the detection result of the gradient detector 50, that the road on which the vehicle MC is traveling has the predetermined or greater up gradient or down gradient, the lighting controller 20A may turn off the illuminator 10. For example, even in such a case, the lighting controller 20A may turn on the illuminator 10 in a case where the detector 30 detects snow cover on the road surface is detected.

The road surface condition viewing apparatuses 1, 1A, and 1B of the example embodiments of the technology may be realized by recording the processes to be executed by the lighting controllers 20, 20A, and 20B in a recording medium readable by a computer system, and by causing the lighting controllers 20, 20A, and 20B to read and execute a program held in the recording medium. A computer system as used herein includes an operating system and hardware such as peripheral devices.

In the case with the use of the World Wide Web (WWW) system, the "computer system" also includes an environment that provides and/or displays a website. The program may be transmitted from the computer system in which the program is held in a storage device, etc., to another computer system through a transmission medium or by a transmission wave in the transmission medium. Here, the "transmission medium" that transmits the program refers to a medium configured to transmit data, e.g., a network (communication network) such as the Internet or a communication line such as a telephone line.

Furthermore, the program as mentioned above may be one that realizes a portion of the process described above. In addition, the program may be a so-called differential file, or a differential program, that is able to realize the process described above by a combination with a program already held in the computer system.

In the above description, some example embodiments of the technology are described in detail with reference to the accompanying drawings. However, it should be appreciated that the example embodiments of the technology described above are merely illustrative and non-limiting and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

According to at least one example embodiment of the technology, it is possible to allow a driver to accurately recognize a condition of a road surface on which a vehicle travels, in a situation in which light reflection by the road surface is expected.

Each of the lighting controllers 20, 20A, and 20B illustrated in FIGS. 1, 6, and 8, respectively, is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the lighting controllers 20, 20A, and 20B illustrated in FIGS. 1, 6, 8, respectively. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the lighting controllers 20, 20A, and 20B illustrated in FIGS. 1, 6, and 8, respectively.

The invention claimed is:

1. A road surface condition viewing apparatus comprising:
   a first illuminator provided on one side of a front of a vehicle and configured to project first dot-shaped pieces of projection light onto a road surface in a vehicle traveling direction, wherein the first dot-shaped pieces of projection light are arranged at predetermined intervals and visually recognizable by a driver of the vehicle; and
   a second illuminator provided on another side of the front of the vehicle and configured to project second dot-shaped pieces of projection light onto the road surface in the vehicle traveling direction, wherein the second dot-shaped pieces of projection light are arranged at the predetermined intervals and visually recognizable by the driver of the vehicle,
   wherein each of the first and second illuminators comprises light-emitting diodes arranged in a straight line along a direction perpendicular to the road surface,
   wherein the first illuminator projects the first dot-shaped pieces of projection within a range in which the first dot-shaped pieces of projection light are formable and are unobtrusive in number to the driver, from a position where fine adjustment of a position of the vehicle is possible, and
   wherein the second illuminator projects the second dot-shaped pieces of projection within the range in which the second dot-shaped pieces of projection light are formable and are unobtrusive in number to the driver, from the position where fine adjustment of the position of the vehicle is possible.

2. The road surface condition viewing apparatus according to claim 1, wherein each of the light-emitting diodes is configured to emit either red light or yellow light.

3. The road surface condition viewing apparatus according to claim 1, further comprising:
   a detector configured to detect rainfall, snowfall, a puddle on the road surface, and snow cover on the road surface; and
   a lighting controller configured to turn on the first and second illuminators in a case where the vehicle is traveling with a headlamp being on and the lighting controller detects one or more of the rainfall, the snowfall, the puddle on the road surface, and the snow cover on the road surface.

4. The road surface condition viewing apparatus according to claim 1, further comprising:
   a gradient detector configured to detect a gradient of a road on which the vehicle is traveling; and
   a lighting controller configured to:
      detect that the road has a predetermined or greater up gradient or down gradient based on the gradient of the road detected by the gradient detector; and
      in response to determining that the road has the predetermined or greater up gradient or down gradient, turn off the first and second illuminators.

5. The road surface condition viewing apparatus according to claim 1, further comprising:
   a steering angle detector configured to detect a steering angle; and
   a lighting controller configured to:
      detect that the vehicle is traveling on a curved section of a road based on the steering angle detected by the steering angle detector; and
      in response to determining that the vehicle is traveling on the curved section of the road, turn off the first and second illuminators.

6. A road surface condition viewing apparatus comprising:
   an illuminator provided on a front side of a vehicle and configured to project dot-shaped pieces of projection light onto a road surface in a vehicle traveling direction, wherein the dot-shaped pieces of projection light are arranged at predetermined intervals and visually recognizable by a driver of the vehicle,
   wherein the illuminator includes light-emitting diodes linearly arranged, and
   wherein the illuminator is disposed on each of both front ends of the vehicle to cause an arrangement direction of the light-emitting diodes to be orthogonal to the road surface,
   wherein the illuminator applies the dot-shaped pieces of projection in a range in which the dot-shaped pieces of projection light are formable and are unobtrusive in number to the driver, from a position where fine adjustment of a position of the vehicle is possible, and
   wherein the road surface condition viewing apparatus further comprises:
      a gradient detector configured to detect a gradient of a road on which the vehicle is traveling; and
      a lighting controller configured to:
         detect that the road has a predetermined or greater up gradient or down gradient based on the gradient of the road detected by the gradient detector; and
         in response to determining that the road has the predetermined or greater up gradient or down gradient, turn off the illuminator.

7. A road surface condition viewing apparatus comprising:
   an illuminator provided on a front side of a vehicle and configured to project dot-shaped pieces of projection light onto a road surface in a vehicle traveling direction, wherein the dot-shaped pieces of projection light are arranged at predetermined intervals and visually recognizable by a driver of the vehicle, wherein the illuminator includes light-emitting diodes linearly arranged, and wherein the illuminator is disposed on each of both front ends of the vehicle to cause an arrangement direction of the light-emitting diodes to be orthogonal to the road surface, wherein the illuminator applies the dot-shaped pieces of projection in a range in which the dot-shaped pieces of projection light are formable and are unobtrusive in number to the driver, from a position where fine adjustment of a position of the vehicle is possible, and wherein the road surface condition viewing apparatus further comprises:
- a steering angle detector configured to detect a steering angle; and
- a lighting controller configured to:
  - detect that the vehicle is traveling on a curved section of a road based on the steering angle detected by the steering angle detector; and
  - in response to determining that the vehicle is traveling on the curved section of the road, turn off the illuminator.

* * * * *